United States Patent
Stillwagon et al.

[11] Patent Number: 5,749,379
[45] Date of Patent: May 12, 1998

[54] NON-NUMERIC TEMPERATURE INDICATING METHOD FOR A HAIR STYLING IRON

[75] Inventors: Ross L Stillwagon, Santa Fe Springs; Fernando Fischbach, Downey; Allen Bennett, Mission Viejo, all of Calif.

[73] Assignee: Golden Supreme, Inc., Santa Fe Springs, Calif.

[21] Appl. No.: 637,859

[22] Filed: Apr. 25, 1996

[51] Int. Cl.[6] ..................................... A45D 1/20
[52] U.S. Cl. ................... 132/200; 219/222; 219/242; 374/141; 132/233
[58] Field of Search ........................ 132/233, 234, 132/223, 224, 225, 227, 232, 200; 219/222, 225, 227, 241, 269, 242, 521; 374/141, 149, 162

[56] References Cited

U.S. PATENT DOCUMENTS

| | | | |
|---|---|---|---|
| 2,136,055 | 11/1938 | Miller | 132/233 |
| 2,177,837 | 10/1939 | Miller | 374/141 |
| 3,301,060 | 1/1967 | Kenmotsu | 374/141 |
| 3,946,196 | 3/1976 | Waters et al. | 219/222 |
| 4,103,145 | 7/1978 | Oliveri | 132/233 |
| 4,588,307 | 5/1986 | Palti | 374/162 |
| 4,803,341 | 2/1989 | Barowski et al. | 219/222 |
| 5,054,615 | 10/1991 | Stillwagon et al. | 132/233 |
| 5,130,640 | 7/1992 | Gambil et al. | 374/141 |

FOREIGN PATENT DOCUMENTS

| | | | |
|---|---|---|---|
| 36078 | 3/1977 | Japan | 219/225 |

*Primary Examiner*—Todd E. Manahan
*Attorney, Agent, or Firm*—Leonard Tachner

[57] ABSTRACT

A curling iron system which, in addition to conventional mechanical elements of base, curling irons, ovens, holders and the like, utilizes an accurate temperature measurement and display capability adapted for use by salon personnel without sophisticated technical know-how. The temperature measurement is implemented by a thermocouple and the display is implemented using a plurality of light emitting diodes (LEDs) connected to the thermocouple by a thermocouple amplifier and a display driver. The combination of thermocouple, LED display and intermediate electronics, operates to provide an accurate indication of the actual surface temperature of the curling iron and thus assure that the iron will be precisely the appropriate temperature for curling or straightening the particular thickness hair being serviced. In the preferred embodiment disclosed herein, the thermocouple is mounted on a platform adjacent the oven and the display is positioned on a vertically oriented member behind the thermocouple platform. In this manner, the user can simply remove the curling iron from the oven chamber and place it on the thermocouple platform while reading the LED display.

1 Claim, 2 Drawing Sheets

NON-NUMERIC TEMPERATURE INDICATING METHOD FOR A HAIR STYLING IRON

BACKGROUND OF THE INVENTION

1. Field of the Invention

The present invention relates generally to hair styling or curling iron assemblies and more specifically to a curling iron system of the type wherein a plurality of curling irons are heated in an oven and then applied one by one to either curl or straighten the hair as a result of the effect of a high temperature surface applied to human hair.

2. Prior Art

Hair styling or curling iron assemblies of the type described herein are well known in the prior art. By way of example, U.S. Pat. No. 5,054,615 to Stillwagon et al, describes an assembly of the aforementioned type wherein an oven is used to heat a plurality of curling irons to a temperature appropriate to achieve the desired curling or straightening when applied one by one to the hair. While the oven used to heat the curling irons may employ a temperature control, the actual temperature of the curling iron surface is not precisely known. If it is not sufficiently hot, the curling or straightening effect is insufficient. If the iron is too hot, hair to which the iron is applied can be burnt or otherwise damaged. Furthermore, human hair comes in different thicknesses. What may be the appropriate temperature for curling or straightening thin hair, may be insufficient to have any curling or straightening effect on thick hair. Similarly, what may be the appropriate temperature to curl or straighten thick-hair, may be too hot and thus burn or otherwise damage thin hair.

Thus there is a need for a curling iron system which includes a relatively accurate temperature indication for the curling iron heated surface itself to enable selection of the appropriate temperature for human hair in general and for the thickness of the specific human hair to be curled or straightened in particular.

SUMMARY OF THE INVENTION

The present invention satisfies the foregoing need by providing a curling iron system which, in addition to conventional mechanical elements of base, curling irons, ovens, holders and the like, utilizes an accurate temperature measurement and display capability adapted for use by salon personnel without sophisticated technical know-how. The temperature measurement is implemented by means of a thermocouple and the display is implemented using a plurality of light emitting diodes (LEDs) connected to the thermocouple by means of a thermocouple amplifier and a display driver. The combination of thermocouple, LED display and intermediate electronics, operates to provide an accurate indication of the actual surface temperature of the curling iron and thus assure that the iron will be precisely the appropriate temperature for curling or straightening the particular thickness hair being serviced. In the preferred embodiment disclosed herein, the thermocouple is mounted on a platform adjacent the oven and the display is positioned on a vertically oriented member behind the thermocouple platform. In this manner, the user can simply remove the curling iron from the oven chamber and place it on the thermocouple platform while reading the LED display.

OBJECTS OF THE INVENTION

It is therefore a principal object of the invention to provide a hair styling iron system of the type having a plurality of curling irons and an oven for heating each such iron, wherein means are provided to measure the actual surface temperature of each such iron as it is removed from the oven.

It is another object of the invention to provide a curling iron system having temperature measurement and display capability to accurately indicate whether the surface of a heated curling iron is at the appropriate temperature for curling or straightening a particular thickness of human hair.

It is still another object of the invention to provide a temperature measurement and display capability for oven-heated hair styling irons, the display comprising a plurality of light emitting diodes arranged to present a graph-like representation of the temperature of the iron.

It is still another object of the invention to provide a salon-oriented hair styling iron system having an accurate temperature indication capability that is calibrated in hair thickness parameters to provide the user with a signal that a curling iron is heated to the appropriate temperature for a selected hair thickness.

BRIEF DESCRIPTION OF THE DRAWINGS

The aforementioned objects and advantages of the present invention, as well as additional objects and advantages thereof will be more fully understood hereinafter as a result of a detailed description of a preferred embodiment when taken in conjunction with the accompanying drawings in which.

DETAILED DESCRIPTION OF A PREFERRED EMBODIMENT

Figure 1:
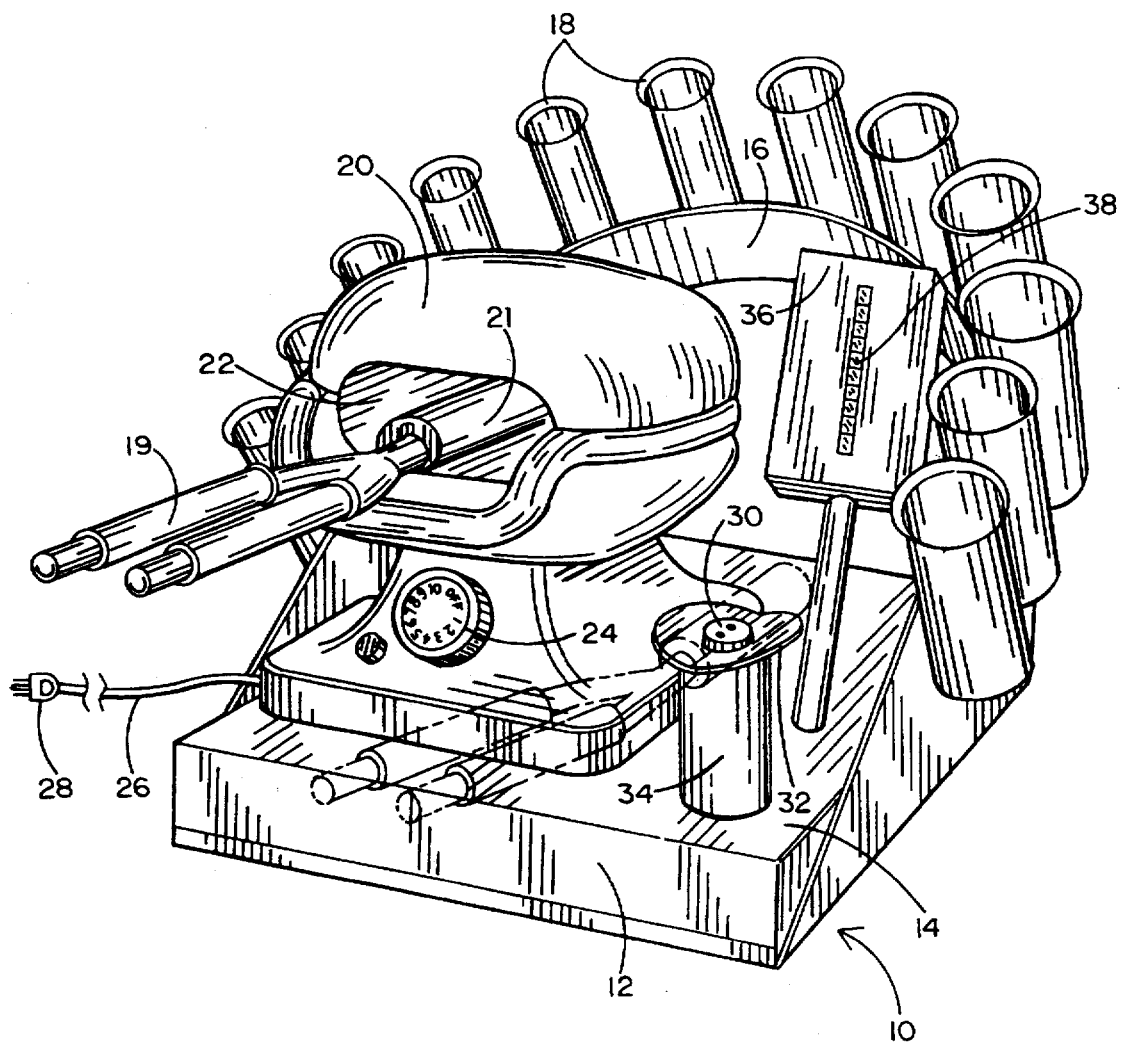
FIG. 1 is a three-dimensional view of a curling iron system in accordance with the present invention.

Referring to FIG. 1 it will be seen that the present invention may, in a preferred embodiment, comprise a curling iron system 10 having a base 12 providing a surface 14 from which an arcuate band 16 extends upwardly at an acute angle relative to the base. A plurality of iron holders 18 are attached along the perimeter of the band to hold a like plurality of curling irons 19. An oven 20 is positioned on the surface 14 and provides a high temperature chamber 22 for heating the hair contact surfaces 21 of each curling iron dependent on the position of a temperature control 24. Oven 20 is normally an electric-type apparatus having an AC cord 26 and an AC plug 28.

The improvements provided in the curling iron system 10 of the present invention comprise a thermocouple 30 and a display 36. Thermocouple 30 is preferably mounted in a platform 32 and supported on a column 34, the latter affixed to the surface 14 at a convenience location adjacent the oven 20. The display 30, which comprises a plurality of readily observable light emitting diodes 38, is preferably vertically positioned behind the thermocouple platform where it can be viewed while a curling iron heated surface 21 is held in contact with the thermocouple 30.

Figure 2:
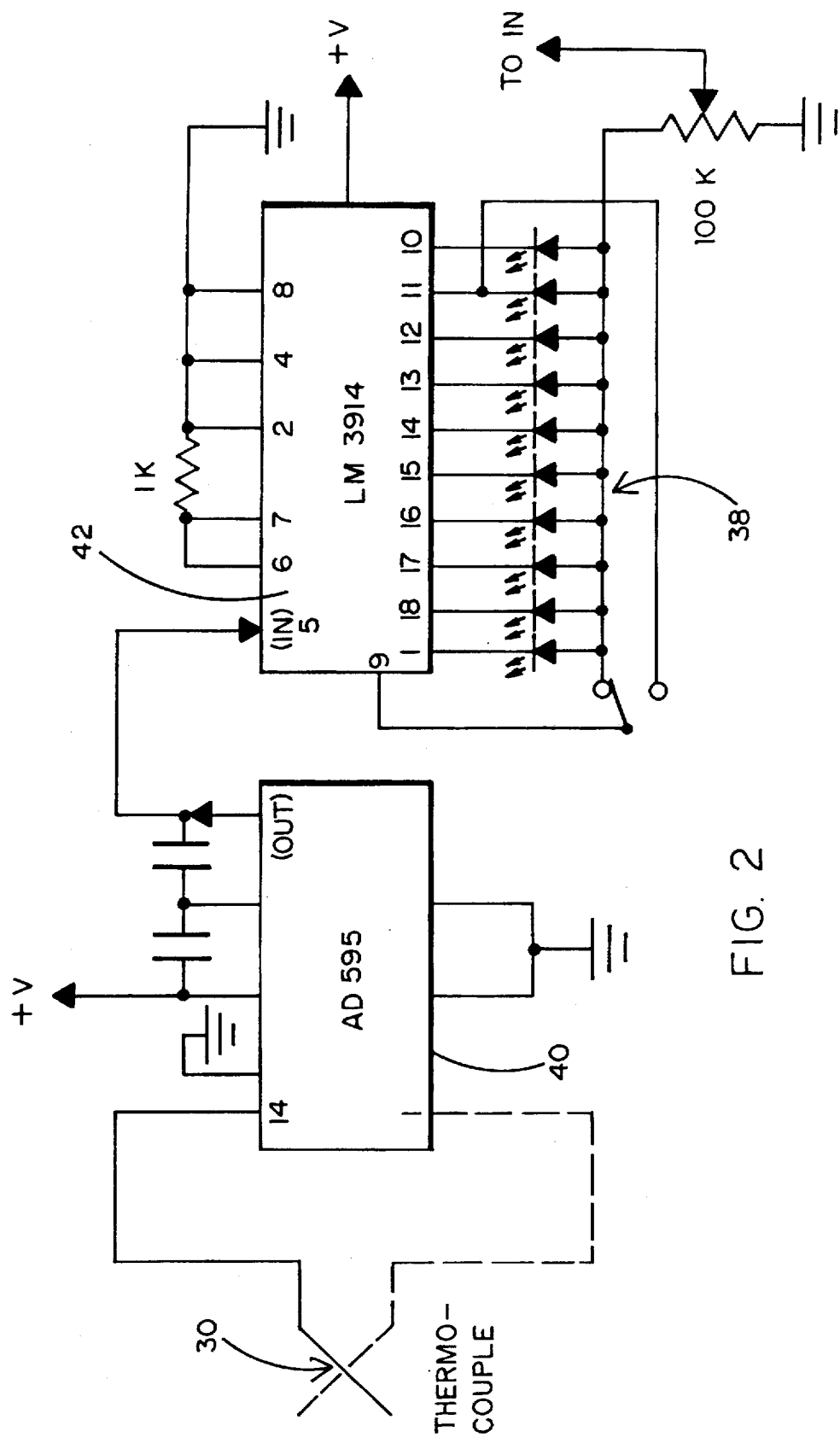
FIG. 2 is a schematic diagram of the temperature measurement and display electronics employed in the preferred embodiment of the invention.

Referring to FIG. 2, it will be seen that the thermocouple 30 is connected to a thermocouple amplifier 40 such as an Analog Devices model AD595 Monolithic Thermocouple Amplifier with cold junction compensation. Typically, thermocouple 30 is a type K (chromel-alumel) thermocouple, but other types of thermocouples may be combined with appropriate amplifiers to provide accurate temperature results over the desired range of temperatures. By way of example, a type J thermocouple (iron-constantan) may be used with a model AD594 device. In the preferred embodiment, the range of temperatures for exciting an LED readout is from 120 degrees Fahrenheit to 475 degrees Fahrenheit. The lowest temperature deemed suitable for a curling iron used on very thin hair is 250 degrees Fahrenheit. The highest temperature deemed suitable for a curling iron used on the thickest hair is 425 degrees Fahrenheit. The thermocouple amplifier 40 provides an output voltage which is proportional to the thermocouple temperature. The output of amplifier 40 is transferred to an LED display driver 42 to which the LED array 38 is connected. Display driver 42 comprises an LM 3914 circuit which is capable of activating up to ten LEDs in a bar mode or 1 of 10 LEDs in a dot mode in response to the input voltage from the thermocouple amplifier. It contains a voltage divider and ten comparators that turn on respective LEDs in sequence as the input voltage uses. Thus, the number of lighted LEDs in the bar mode or the position of the lighted LED in the dot mode, provides an indication of the thermocouple measurement of the temperature of the curling iron surface with which the thermocouple is in contact.

It will be understood that there are numerous alternative ways to measure and display the temperature of the heated curling iron surface. Therefore, the disclosed embodiment is not to be considered limiting of the invention, but is preferred because the LEDs can be calibrated for different hair thicknesses or other such salon-oriented terms of the art to simplify usage for those with little or no technical know-how.

Having thus described a preferred embodiment, what is claimed is:

1. A non-numeric indicating method of accurately determining the appropriate temperature of a heated curling iron for a selected hair thickness to curl that thickness hair without heat damaging it; the method comprising the following steps:

a) providing a thermocouple in proximity to at least one curling iron heated to a temperature in the range of at least 250 degrees F. to at least 425 degrees F.;

b) connecting said thermocouple to an electronic circuit comprising an array of light emitting diodes for sequential activation of said diodes in response to the actual temperature of a curling iron in contact with said thermocouple; and c) calibrating said electric circuit to activate said diodes in sequence in accordance with increasing temperature at said thermocouple, said calibration providing a visual correlation between appropriate hair thickness temperature and the number and position of the activated diodes.

* * * * *